(12) United States Patent
Ishida

(10) Patent No.: US 8,181,234 B2
(45) Date of Patent: May 15, 2012

(54) AUTHENTICATION SYSTEM IN CLIENT/SERVER SYSTEM AND AUTHENTICATION METHOD THEREOF

(75) Inventor: Natsuki Ishida, Tokyo (JP)

(73) Assignee: Hitachi Software Engineering Co., Ltd., Kanagawa (JP)

( * ) Notice: Subject to any disclaimer, the term of this patent is extended or adjusted under 35 U.S.C. 154(b) by 483 days.

(21) Appl. No.: 11/908,231

(22) PCT Filed: Nov. 28, 2006

(86) PCT No.: PCT/JP2006/323728
§ 371 (c)(1),
(2), (4) Date: Sep. 18, 2009

(87) PCT Pub. No.: WO2007/066542
PCT Pub. Date: Jun. 14, 2007

(65) Prior Publication Data
US 2010/0017860 A1  Jan. 21, 2010

(30) Foreign Application Priority Data
Dec. 9, 2005  (JP) .................. 2005-356336

(51) Int. Cl.
*G06F 7/04* (2006.01)
*G06F 21/00* (2006.01)
*H04L 29/06* (2006.01)
*H04L 9/32* (2006.01)
*H04K 1/00* (2006.01)
*G06K 7/10* (2006.01)
*G06K 19/06* (2006.01)
*G06K 9/18* (2006.01)
*G06K 9/80* (2006.01)
*G08C 21/00* (2006.01)

(52) U.S. Cl. .............. 726/7; 726/4; 726/5; 713/150; 713/161; 713/168; 713/182; 380/255; 235/462.01; 235/462.02; 235/462.07; 235/462.09; 235/462.1

(58) Field of Classification Search .......... 726/7, 4, 726/5; 713/150, 161, 168, 182; 380/255; 235/462.01, 462.02, 462.07, 462.09, 462.1
See application file for complete search history.

(56) References Cited

U.S. PATENT DOCUMENTS
2002/0095569 A1 *  7/2002  Jerdonek .............. 713/155
(Continued)

FOREIGN PATENT DOCUMENTS
JP  2001-184310  7/2001
JP  2002-259344  9/2002
JP  2003-030146  1/2003

*Primary Examiner* — Aravind Moorthy
(74) *Attorney, Agent, or Firm* — Mattingly & Malur, PC

(57) ABSTRACT

The security of an authentication system using a one-time password is increased, a shift from an authentication system using a fixed password is simplified, and a range of use is increased. An authentication system wherein a one-time password is synchronized with time, or an authentication system wherein a one-time password is synchronized with the number of online service authentication requests, is provided. When a one-time password client 9 downloads a one-time password for online service authentication from a one-time password server 2, current time information or a current value of the number of online service authentication requests is made to coincide between the client and server, and an online service authentication request is authenticated as long as the downloaded one-time password for online service authentication is valid. The one-time password may also be synchronized with service usage details contained in the online service authentication request.

2 Claims, 6 Drawing Sheets

U.S. PATENT DOCUMENTS

| | | | |
|---|---|---|---|
| 2004/0012569 A1* | 1/2004 | Hara | 345/169 |
| 2005/0091490 A1* | 4/2005 | Ogura | 713/165 |
| 2005/0283618 A1* | 12/2005 | Min | 713/182 |
| 2006/0036858 A1* | 2/2006 | Miura et al. | 713/170 |
| 2006/0085846 A1* | 4/2006 | Uno et al. | 726/6 |
| 2006/0086796 A1* | 4/2006 | Onogi | 235/454 |
| 2006/0242685 A1* | 10/2006 | Heard et al. | 726/3 |

* cited by examiner

AUTHENTICATION SYSTEM IN CLIENT/SERVER SYSTEM AND AUTHENTICATION METHOD THEREOF

TECHNICAL FIELD

The present invention relates to an authentication system and authentication method, and in particular, to an authentication system and authentication method suitable for authentication of a client and authentication of e-mail in a client/server system.

BACKGROUND ART

An authentication system using a fixed password as a technique for performing authentication of a client in a client/server system is known in the art.

FIG. 1 is a block diagram showing an example of an authentication system using the related art technique using a fixed password. In FIG. 1, 1 denotes an online service server, 3 denotes an information terminal device, 5 denotes a network, 6 denotes a database, and 7 denotes an online service client.

The authentication system using the related art technique with a fixed password is constituted such that an information terminal device 3 is connected to the online service server 1 via the network 5. The online service server 1 is connected to the database 6, and the information terminal device 3 is provided with the online service client 7. Herein, an online service provider owns the online service server 1 and database 6. The online service user owns the information terminal device 3. The above online service server 1 is a WWW server, the information terminal device 3 is a personal computer, and the online service client 7 is a WWW browser.

Next, the initial state of the authentication system constituted as above, using the fixed password, will be described.

The database 6 stores data such as the online service user ID and the password for online service authentication for each online service user. The online service user himself stores data such as the online service user ID and the fixed password for online service authentication. As the password for online service authentication, a fixed password for online service authentication is set up.

FIG. 2 is a flow chart describing the processing operation of the online service authenticating processing of the authentication system using a fixed password. Next, this will be described.

(1) The online service user inputs, to the online service client 7 of the information terminal device 3, an online service user ID, a password for online service authentication, and the service usage details using the fixed password for online service authentication as the password for online service authentication. Here, the service usage details are operating details such as an online service login, product buying/selling, or commercial details such as bank transfer, for example (Step 101).

(2) The online service client 7 of the information terminal device 3 transmits an online service authentication request including the inputted online service user ID, password for online service authentication, and service usage details, to the online service server 1 (Step 102).

(3) The online service server 1 searches the database 6 by sets of the online service user IDs and passwords for online service authentication which are contained in the online service authentication request which was received. If there is a password matching a set of the online service user ID and the password for online service authentication stored in the database, and the number of authentications has failed equal to or less than a given number of times within a fixed time (account lockout is not performed), i.e., when the online service authentication request containing the online service user ID in the online service authentication request which was received was successfully authenticated, the online service is provided according to the received service usage details (Step 103).

In the authentication system using a fixed password, since the fixed password for online service authentication is not changed frequently, if a keylogger or the like is set up by an information terminal device used by a user and the online service user ID and the fixed password for online service authentication are leaked, there is a high risk that these passwords will be illegally reused.

A technique is known for authentication of a client in a client/server system which takes measures against the risks of the authentication system using the fixed password described above, wherein the system uses a one-time password. In this authentication system using a one-time password, a one-time password server and a one-time password client share the one-time password for online service authentication, the one-time password client displays the one-time password for online service authentication, and online service authenticating processing is performed using the one-time password for online service authentication as the password for online service authentication.

Among authentication systems using a one-time password, there is an authentication system which downloads a one-time password from a one-time password server, wherein an online service user inputs an online service user ID and a fixed password for one-time password download into a one-time password client, the one-time password client transmits a one-time password download request for online service authentication containing a set of the online service user ID and the fixed password for one-time password download to the one-time password server, the online service user ID and the fixed password for one-time password download contained in the one-time password download request for online service authentication received by the one-time password server received are verified, and the one-time password for online service authentication is transmitted to and shared with the one-time password client.

Among authentication systems using a one-time password, there is an authentication system as disclosed in Patent Publication 1, wherein a one-time password is synchronized with time, an online service server and a one-time password client independently calculate a one-time password for online service authentication with a secure hash function for an online service user ID, a fixed password and the present time information as an argument, and share the password.

Among authentication systems using a one-time password, there is an authentication system wherein a one-time password is synchronized with a number of online service authentication requests, an online service server and a one-time password client independently calculate a one-time password for online service authentication with a secure hash function for an online service user ID, a fixed password and the current value of the number of online service verification requests as an argument, and share the password.

In the authentication system using the one-time password described above, since the one-time passwords for online service authentication differ for each current time and each number of times there is an online service authentication request, the risk of illegal reuse is low even when an online service user ID and the one-time password for online service authentication are leaked with a keylogger or the like.

Patent Publication 1: Japanese Patent Application Laid-Open Publication No. 2002-259344.

DISCLOSURE OF THE INVENTION

Problems to be Solved by the Invention

However, all of the authentication systems using the one-time password by the related art technique described above have the following problems.

As the first problem, in the case of an authentication system which downloads a one-time password from a one-time password server in the authentication system using the related art technique, the one-time password download request for online service authentication is authenticated using the fixed password for one-time password download inputted by the online service user. Consequently, the security of the one-time password will always be dependent on the security of the fixed password inputted by the online service user.

As the second problem, the authentication system using the related art technique assumes only the case where the authentication system uses a new one-time password. The case where there is a shift from an authentication system using a fixed password to an authentication system using a one-time password is not covered. Consequently, a change in Step 103 described in FIG. 2 which performs authentication of the online service authentication request is required.

As the third problem, in the case of an authentication system using the related technique where the one-time password is synchronized with time and an authentication system where the one-time password is synchronized with the number of online service authentication requests, the authentication system using the related art technique must assume the case where the current time information or the current value of the number of times of online service authentication requests on the online service server is not the same as that of the one-time password client. For this reason, there is the problem that the one-time password for online service authentication calculated with time information for past or upcoming several minutes or the number of online service authentication requests several occasions in the future as an argument is also erroneously successfully authenticated.

As the fourth problem, in the case of an authentication system using the related technique where a one-time password is synchronized with time and an authentication system wherein a one-time password is synchronized with the number of online service authentication requests, the online service server and one-time password client independently calculate the one-time password for online service authentication. Consequently, there is the problem that attacks by attackers are possible without a limit to time or the number of times.

As the fifth problem, the strength of the one-time password for online service authentication is always constant. Hence, if a specific online service user ID is attacked, the strength of the one-time password for online service authorization cannot be increased.

As the sixth problem, the one-time password is not synchronized with the service user details contained in the online service authentication request. Consequently, even if the service usage details included in an online service authentication request are altered, authentication will erroneously succeed.

As the seventh problem, the authentication system using the related art technique does not assume the case where a portable terminal device comprises an online service client and a one-time password client. Consequently, a one-time password cannot be used for online service authenticating processing when the online service client of a portable terminal device is used.

As the eighth problem, the authentication system using the related art technique assumes only the case where a one-time password is used for authentication of a client, and does not assume the case where a one-time password is used for authentication of e-mail. Consequently, the one-time password cannot be used as a measure against phishing mail.

As the ninth problem, although the authentication system of the related art technique can increase the security of a password, the security of an ID cannot be increased and, moreover, an online service user ID can easily be guessed by consecutive numbers. Consequently, an attacker can guess an effective online service user ID, and can perform an account lockout.

It is therefore an object of the present invention, which aims to address the problem of the related art technique using the one-time password described above, to provide an authentication system and authentication method which permit improvement in the security of the authentication system using a one-time password, easy system shift and an increase of a usage range.

Means for Solving the Problems

According to the present invention, the object is attained by an authentication system in a client/server system in which an online service server, a one-time password server, an online service client, and a one-time password client are connected via a network, wherein the one-time password server, after authenticating an initialization request from the one-time password client by a fixed password for one-time password client initialization, shares the fixed password for one-time password download with the one-time password client, and after authenticating a one-time password download request for online service authentication by a fixed password for one-time password download, shares the one-time password for online service authentication with the one-time password client. The online service server then authenticates the online service authentication request received from the online service client by the one-time password for online service authentication.

The above object is also attained by an authentication system in a client/server system in which an online service server, a one-time password server, an online service client, and a one-time password client are connected via a network, and the online service server and one-time password server are connected to a database. The initial state of the authentication system is a state where a fixed password for online service authentication is set as a password for online service authentication stored in the database. The one-time password server, after authenticating an initialization request from the one-time password client, sets a dummy one-time password as the password for online service authentication stored in the database, and after authenticating the one-time password download request for online service authentication, sets the one-time password for online service authentication as the password for online service authentication stored in the database. The online service server authenticates the online service authentication request received from the online service client by the password for online service authentication stored in the database, and the online service server or the one-time password server authenticates the one-time password download request for online service authentication, and when the one-time password for online service authentication shared with the one-time password client does not meet authentication conditions of the online service authentication request, sets the dummy one-time password as the password for online service authentication stored in the database.

The object of the present invention is also attained by an authentication system in a client/server system in which an online service server, a one-time password server, an online service client, and a one-time password client are connected via a network, wherein the one-time password server, after authenticating a one-time password download request for online service authentication, shares plural one-time passwords for online service authentication with the one-time password client, and the one-time password client, after sharing the one-time password for online service authentication with the one-time password server, displays any one of the plural one-time passwords for online service authentication displayed in turn at a fixed time interval. When a fixed time elapses after the online service server shares the one-time password for online service authentication, the online service server treats the online service authentication request received from the online service client as an authentication failure, and makes authentication by one of the plural one-time passwords for online serve authentication used as authentication conditions in order at a fixed time interval after sharing the online service authentication one-time passwords.

The object of the present invention is also attained by an authentication system in a client/server system in which an online service server, a one-time password server, an online service client, and a one-time password client are connected via a network, wherein the one-time password server, after authenticating a one-time password download request for online service authentication, shares plural one-time passwords for online service authentication with the one-time password client, and the one-time password client displays sets of the number of online service authentication requests and the one-time password for online service authentication. When the number of one-time passwords for online service authentication shared by the number of online service authentication requests after sharing the one-time password for online service authentication is exceeded, the online service server treats the online service authentication request received from the online service client as an authentication failure, and authenticates the one-time password for online service authentication by the one-time password for online service authentication paired with the number of online service authentication requests after sharing the one-time passwords for online service authentication.

The object of the present invention is also attained by an authentication system in a client/server system in which an online service server and an online service client are connected via a network, and the online service server, a one-time password server, the online service client, and a one-time password client are included, wherein the online service server authenticates the online service authentication request received from the online service client by a one-time password for online service authentication whose number of characters is the current value of the one-time password strength for online service authentication. If the authentication fails, the online service server increases the current value of the one-time password strength for online service authentication.

The above object is also attained by an authentication system in a client/server system in which an online service server, a one-time password server, and an online service client are connected via a network, and the online service server, the one-time password server, the online service client, and a one-time password client are included, wherein the one-time password server and the one-time password client share shared secret information, and when there is an online service authentication preparation request containing the service usage details received from the online service client, the one-time password server shares the service usage details, information for authenticating the service usage details by the shared secret information and information for calculating, by the shared secret information, the one-time password for online service authentication by the shared secret information with the one-time password client. When authentication, by the shared secret information, of information for authenticating the service usage details by the shared secret information is successful, the one-time password client, by the shared secret information, calculates the one-time password for online service authentication with respect to the information for calculating the one-time password for online service authentication by the shared secret information, and displays the service usage details and the one-time password for online service authentication. The online service server authenticates the online service authentication request received from the online service client by a one-time password for online service authentication.

The above object is also attained by an authentication system in a client/server system in which an online service server, a one-time password server, and an online service client are connected via a network, and the online service server, the one-time password server, the online service client, and a one-time password client are included, wherein the one-time password server stores service usage details with respect to an online service authentication preparation request containing the service usage details received from the online service client, the one-time password server, after authenticating a download request for a one-time password for online service authentication, shares sets of service usage details and one-time password for online service authentication with the one-time password client, and the one-time password client displays the sets of service usage details and one-time password for online service authentication. The online service server then authenticates the online service authentication request received from the online service client by a one-time password for online service authentication.

The above object is also attained by the above system wherein the one-time password server makes the number of characters of the one-time password for online service authentication the current value of the one-time password strength for online service authentication with respect to an online service authentication preparation request containing the service usage details received from the online service client, increases the current value of the one-time password strength for online service authentication, and if the online service server succeeds in authenticating the online service authentication request received from the online service client, the online service server decreases the current value of the one-time password strength for online service authentication.

The above object is also attained by an authentication system in a client/server system in which an online service server and a portable terminal device are connected via a network, and the portable terminal device includes an online service client and a one-time password client, wherein the one-time password client of the portable terminal device starts the online service client of the portable terminal device with the one-time password for online service login as an argument. The online service server then authenticates the online service login request received from the online service client of the portable terminal device by a one-time password for online service login.

The above object is also attained by an authentication system in a client/server system in which an online service server, a one-time password server, and a portable terminal device are connected via a network, and the portable terminal device includes an online service client and a one-time password client, wherein the one-time password server, after authenticating a one-time password client initialization request by a fixed password for one-time password client initialization, shares a fixed password for one-time password download with the one-time password client of the portable terminal device, and after authenticating a one-time password download request for online service login with a fixed password for one-time password download, shares the one-time password for online service login with the one-time password client of the portable terminal device. The one-time password client of the portable terminal device starts the online service client of the portable terminal device with the one-time password for online service login as an argument, and the online service server authenticates the online service login request received from the online service client of the portable terminal device by a one-time password for online service login.

The above object is also attained by an authentication system in a client/server system in which a one-time password server and a one-time password client are connected via a network, wherein the one-time password server records a one-time password for e-mail authentication in e-mail, and the one-time password client displays the one-time password for e-mail authentication.

The above object is also attained by an authentication system in a client/server system in which a one-time password server and a one-time password client are connected via a network, wherein the one-time password server, after authenticating a one-time password client initialization request with a fixed password for one-time password client initialization, shares a fixed password for one-time password download with a one-time password client, records the one-time password for e-mail authentication in e-mail, and after authenticating the one-time password download request for e-mail authentication by the fixed password for one-time password download, shares the one-time password for e-mail authentication with the one-time password client. The one-time password client displays the one-time password for e-mail authentication.

The above object is also attained by an authentication system in a client/server system in which an online service server, a one-time password server, an online service client, and a one-time password client are connected via a network, wherein the one-time password server and one-time password client share an online service user sub ID, the one-time password client displays the online service user sub ID, and the online service server authenticates the online service authentication request received from the online service client by the online service user sub ID.

The above object is also attained by the above system wherein the online service server, after receiving a set of the encrypted service usage details and the one-time password for online service authentication from the one-time password server, encodes it as a QR Code, and transmits it to the online service client. The online service client displays the QR Code, and after the one-time password client inputs and decodes the QR Code, then decrypt the code with the common key.

The above object is also attained by an authentication method in a client/server system in which an online service server, a one-time password server, an online service client, and a one-time password client are connected via a network, wherein the one-time password server, after authenticating an initialization request from the one-time password client by a fixed password for one-time password client initialization, shares the fixed password for one-time password download with the one-time password client, and after authenticating a one-time password download request for online service authentication by a fixed password for one-time password download, shares the one-time password for online service authentication with the one-time password client. The online service server authenticates the online service authentication request received from the online service client by the one-time password for online service authentication.

The above object is also attained by an authentication method in a client/server system in which an online service server, a one-time password server, an online service client and one-time password client are connected via a network, and the online service server and one-time password server are connected to a database. The initial state of the authentication system is a state where a fixed password for online service authentication is set as a password for online service authentication stored in the database. The one-time password server, after authenticating an initialization request from the one-time password client, sets a dummy one-time password as the password for online service authentication stored in the database, and after authenticating the one-time password download request for online service authentication, sets the one-time password for online service authentication as the password for online service authentication stored in the database. The online service server authenticates the online service authentication request received from the online service client by the password for online service authentication stored in the database, and the online service server or the one-time password server authenticates the one-time password download request for online service authentication. When the one-time password for online service authentication shared with the one-time password client does not meet the authentication conditions of the online service authentication request, the dummy one-time password is set as the password for online service authentication stored in the database.

The above object is also attained by an authentication method in a client/server system in which an online service server, a one-time password server, an online service client, and a one-time password client are connected via a network, wherein the one-time password server, after authenticating a one-time password download request for online service authentication, shares plural one-time passwords for online service authentication with the one-time password client, and the one-time password client, after sharing the one-time password for online service authentication with the one-time password server, displays any one of the plural one-time passwords for online service authentication displayed in turn at a fixed time interval. When a fixed time elapses after the online service server shares the one-time password for online service authentication, the online service server treats the online service authentication request received from the online service client as an authentication failure, and makes authentication by one of the plural one-time passwords for online serve authentication used as authentication conditions in order at a fixed time interval after sharing the one-time passwords for online service authentication.

The above object is also attained by an authentication method in a client/server system in which an online service server, a one-time password server, an online service client, and a one-time password client are connected via a network, wherein the one-time password server, after authenticating a one-time password download request for online service authentication, shares plural one-time passwords for online service authentication with the one-time password client, and the one-time password client displays sets of the number of online service authentication requests and the one-time password for online service authentication. When, the number of one-time passwords for online service authentication shared by the number of online service authentication requests after sharing the one-time password for online service authentication is exceeded, the online service server treats the online service authentication request received from the online service client as an authentication failure, and authenticates the one-time password for online service authentication paired with the number of online service authentication requests after sharing the one-time passwords for online service authentication.

The above object is attained by an authentication method in a client/server system in which an online service server, a one-time password server, and an online service client are connected via a network, and the online service server, the one-time password server, the online service client and a one-time password client are included, wherein the one-time password server stores service usage details with respect to an online service authentication preparation request containing the service usage details received from the online service client, the one-time password server, after authenticating a one-time password download request for online service authentication, shares a common key for encrypting sets of service usage details and one-time passwords for online service authentication, with the one-time password client, and the one-time password client decodes, with the common key, and displays the sets of service usage details and one-time password for online service authentication. The online service server authenticates the online service authentication request received from the online service client by a one-time password for online service authentication.

The above object is also attained by the above method wherein the online service server, after receiving the encrypted service usage details and the one-time password for online service authentication from the one-time password server, encodes it to a QR Code and transmits it to the online service client. The online service client then displays the QR Code, the one-time password client inputs and decodes the QR Code, then decrypt the code with the common key.

Effects of the Invention

According to this invention, in a client/server system, the security of an authentication system using a one-time password can be improved, easy shift from an authentication system using a fixed password can be realized, and the use range can be widened.

Best Mode For Carrying Out The Invention

Hereafter, an embodiment of the authentication system and authentication method according to the present invention will be described in detail referring to the drawings.

FIG. 3 is a block diagram showing the construction of the authentication system according to one embodiment of the present invention. The embodiment of the present invention described below is an authentication system using a one-time password. In FIG. 3, 2 denotes a one-time password server, 4 denotes a portable terminal device, 8 denotes an online service client and denotes a one-time password client. The remaining symbols are identical to those of FIG. 1.

In the authentication system of the embodiment of the present invention shown in FIG. 3, the on-line service server 1, one-time password server 2, information terminal device 3 and portable terminal device 4 are connected via the network 5. The online service server 1 and one-time password server 2 are connected to database 6. The information terminal device 3 comprises an online service client 7, and the portable terminal device 4 comprises the online service client 8 and one-time password client 9.

In the above, an online service provider owns the online service server 1, one-time password server 2, and database 6, and an online service user owns the information terminal device 3 and portable terminal device 4. The portable terminal device 4 may be a cellular phone or the like.

Next, the initial state of the authentication system using the one-time password according to the embodiment of the present invention constituted as described above will be described.

For each online service user, the database 6 stores the data of an online service user ID, a password for online service authentication, and a fixed password for one-time password client initialization. The online service user stores the data of the online service user ID and fixed password for one-time password client initialization.

However, when shifting to the authentication system according to the present invention from an authentication system using a fixed password, the fixed password for online service authentication is set to the password for online service authentication. When constructing a new authentication system according to the present invention, a dummy one-time password generated at random by the one-time password server 2 is set to the password for online service authentication. In the following description, data manipulation in the database 6 is targeted as data to be paired with online service user IDs.

Next, the processing operation of the initialization process of the one-time password client in the authentication system according to the embodiment of the present invention will be described. Prior to the initialization process of the one-time password client, the online service user generates and stores a fixed password for one-time password client startup at random. The processing flow here is not shown.

(Process 201)

The online service user inputs an online service user ID, a fixed password for one-time password client initialization and a fixed password for the one-time password client startup into the one-time password client 9.

(Process 202)

The one-time password client 9 transmits a one-time password client initialization request containing sets of online service user IDs and fixed passwords for one-time password client initialization to the one-time password server 2.

(Process 203)

The one-time password server 2 searches the database 6 by sets of online service user IDs and fixed passwords for one-time password client initialization contained in the received one-time password client initialization request. If there is a match with a set of online service user IDs and fixed passwords for one-time password client initialization stored in the database 6, and if the one-time password client initialization request containing the online service user ID in the received one-time password client initialization request has failed authentication a given number of times or less within a fixed time (account lockout is not performed), a dummy one-time password is generated at random, the dummy one-time password is set as the password for online service authentication stored in the database 6, shared secret information is generated at random and this shared secret information is stored in the database 6, and the shared secret information is transmitted to the one-time password client 9. The shared secret information is a key of the fixed password or a cryptosystem shared by the one-time password server 2 and one-time password client 9.

(Process 204)

The one-time password client 9, when it receives the transmitted shared secret information, stores the online service user ID, the fixed password for the one-time password client startup and shared secret information.

The above processing completes the initialization process of the one-time password client.

Next, the startup of the one-time password client in the authentication system according to the embodiment of the present invention will be described. It is assumed that initialization process of the one-time password client described before the startup of the one-time password client, has been completed. The processing flow here is not shown.

(Process 301)

The online service user inputs the fixed password for the one-time password client startup into the one-time password client 9.

(Process 302)

The one-time password client 9, if the inputted fixed password for one-time password client startup is identical to the fixed password for one-time password client startup stored by the one-time password client 9, it is permitted to execute the processing of Step 401 and later steps by the one-time password client 9 to be described in FIG. 4.

(Process 303)

The one-time password client 9, if the fixed password for one-time password client startup inputted is not identical a fixed number of times in succession to the fixed password for one-time password client startup stored by the one-time password client 9, erases the online service user ID, the fixed password for one-time password client startup and shared secret information stored by the one-time password client 9.

FIG. 4 is a flow chart describing the processing operation of the online service authentication process when the online service client of an information terminal device is used (when the one-time password is synchronized with time) in the authentication system according to the present invention. Next, this will be described. The shared secret information used for this processing presupposes that it is a fixed password for one-time password download.

(1) The one-time password client 9 of the portable terminal device 4 transmits a one-time password download request for online service authentication containing sets of online service user IDs and fixed passwords for one-time password download to the one-time password server 2 (Step 401).

(2) The one-time password server 2 searches the database 6 by the sets of online service user IDs and fixed passwords for one-time password download contained in the received one-time password download request for online service authentication. If there is a match with a set of online service user IDs and fixed passwords for one-time password download stored in the database 6, N one-time passwords for online service authentication (OTP [0]-OTP [N−1]) are generated at random, OTP [0] is set as the password for online service authentication stored in the database 6, and OTP [0]-OTP [N−1] are transmitted to the one-time password client 9 (Step 402).

(3) The one-time password client 9 displays the online service user ID and OTP [0] which is one of the one-time passwords for online service authentication received (Step 403).

(4) The one-time password server 2, after performing the processing of the Step 402, sets OTP[i] as the password for online service authentication stored in the database 6 after a fixed time (Ti seconds, $1 \leq i \leq -1$) has elapsed. The one-time password server 2, after performing the processing of the Step 402, generates a dummy one-time password at random after a fixed time (TN seconds) has elapsed, and sets the dummy one-time password as the password for online service authentication stored in the database 6 (Step 404).

(5) The one-time password client 9, after performing the processing of the Step 403, displays the online service user ID and OTP[i] which is one of the one-time passwords for online service authentication after a fixed time (Ti seconds, $1 \leq i \leq N-1$) has elapsed. The one-time password client 9, after performing the processing of the Step 403 (Step 405), terminates the display of the online service user ID and the one-time password for online service authentication after a fixed time (TN seconds) has elapsed.

(6) The online service user inputs the online service user ID, the password for online service authentication and the service usage details, using the one-time password for online service authentication currently displayed on the one-time password client 9 as the password for online service authentication, to the online service client 7 of the information terminal device 3 (Step 406).

(7) The online service client 7 of the information terminal device 3 transmits the online service authentication request containing sets of online service user IDs, passwords for online service authentication and service usage details to the online service server 1 (Step 407).

(8) The online service server 1, upon receiving the online service authentication request transmitted by the processing of the Step 407, performs the same processing as the processing of Step 103 in the related art technique described in FIG. 2, (Step 408).

FIG. 5 is a flow chart describing the processing operation of online service authentication process when the online service client of an information terminal device is used (when the one-time password is synchronized with the number of online service authentication requests) in the authentication system according to the present invention. Next, this will be described. It is assumed that the shared secret information used for this processing is a fixed password for one-time password download. It is also assumed that the database 6 stores the current value which is the number of online service authentication requests to which N was set as the maximum number of online service authentication requests for each online service user in the initial state of the authentication system of this invention.

(1) The one-time password client 9 of the terminal device 4 transmits the one-time password download request for online service authentication containing sets of online service user IDs and fixed passwords for one-time password download to the one-time password server 2 (Step 501).

(2) The one-time password server 2 searches the database 6 by the sets of online service user IDs and fixed passwords for one-time password download contained in the received one-time password download request for online service authentication. If there is a match with the sets of online service user IDs and fixed passwords for one-time password download stored in the database 6, N one-time passwords for online service authentication (OTP [1]-OTP [N]) are generated at random, OTP [1] is set as the password for online service authentication stored by database 6, the initial value 1 of the number of online service authentication requests is set as the current value of the number of online service authentication requests stored in the database 6, OTP [2]-OTP [N] are stored in the database 6, and the one-time passwords for online service authentication OTP [1]-OTP [N] are transmitted to the one-time password client 9 (Step 502).

(3) The one-time password client 9 receives and stores the transmitted one-time passwords for online service authentication OTP [1]-OTP [N] (Step 503).

(4) The one-time password client 9 displays sets ($1 \leq i \leq N$) of online service user IDs, numbers of times i of online service authentication requests and one-time passwords OTP [i] for online service authentication (Step 504).

(5) The online service user inputs the online service user ID, password for online service authentication and service usage details to the online service client 7 of the information terminal device 3, using, as the password for online service authentication, the one-time password OTP[x] for online service authentication currently displayed by the one-time password client 9 which is paired with the current value x of the number of online service authentication requests (Step 505).

(6) The online service client 7 of the information terminal device 3 transmits the online service authentication request containing the sets of online service user IDs, passwords for online service authentication and service usage details to the online service server 1 (Step 506).

(7) The online service server 1, upon receiving the online service authentication request transmitted by the processing of Step 506, performs the same processing as the processing of the Step 103 in the related art technique described in FIG. 2 (Step 507).

(8) Subsequently, the online service server 1, when the current value x of the number of online service authentication requests stored in the database 6 is equal to the maximum value N of the number of online service authentication requests, generates a dummy one-time password at random. The dummy one-time password is set as the password for online service authentication stored in the database 6, and a screen which suggests one-time password download for online service authentication, is transmitted to the online service client 7 of the information terminal device 3. Also, if the current value x of the number of online service authentication requests stored in the database 6 is less than the maximum number N of online service authentication requests, the online service server 1 sets OTP [x+1] as the password for online service authentication stored in the database 6, sets x+1 as the current value of the number of online service authentication requests stored in the database 6, and transmits a screen which displays the current value x+1 of the number of online service authentication requests to the online service client 7 of the information terminal device 3 (Step 508).

Next, a measure process will be described which, in the authentication system of the present invention, makes it hard to guess the one-time password and which can increase security if a specific online service user ID is attacked. This processing can be implemented by changing part of the flow of FIG. 4 and FIG. 5 described above. In the initial state of the authentication system according to the present invention, it is assumed that the database 6 stores the current value of the strength of the one-time password for online service authentication for which an initial value of the one-time password strength for online service authentication was set, for each online service user.

By the processing of the Step 408 in FIG. 4, or processing of the Step 507 in FIG. 5, the online service server 1 acquires the one-time password strength current value x for online service authentication stored in the database 6, authenticates whether or not the first x characters are equal for the password for online service authentication contained in the online service authentication request received, and the password for online service authentication stored in the database 6, sets a one-time password strength initial value for online service authentication as the current value of the strength of the one-time password for online service authentication stored in the database 6 if authentication succeeds, sets x+1 as the current value of the strength of the one-time password for online service authentication stored in the database 6 if authentication fails, and transmits a screen which displays the current value of the strength of the one-time password for online service authentication to the online service client 7 of the information terminal device 3.

FIG. 6 is a flow chart describing the processing operation of online service authentication process when the online service client of an information terminal device is used (when the one-time password is synchronized with the service usage details contained in the online service authentication request) in the authentication system according to the present invention. Next, this will be described. Let the shared secret information used for this processing be a common key K of a common key encryptosystem. It is assumed that the database 6 stores the current value of the strength of the one-time password for online service authentication to which the initial value of the strength of the one-time password for online service authentication was set, in the initial state of the authentication system according to the present invention, for each online service user.

(1) The online service user inputs an online service user ID and the service usage details into the online service client 7 of the information terminal device 3 (Step 601).

(2) The online service client 7 of the information terminal device 3 transmits an online service authentication preparation request containing sets of online service user IDs and the service usage details to the online service server 1 (Step 602).

(3) The online service server 1 transmits the online service authentication preparation request containing the sets of online service user IDs and service usage details to the one-time password server 2 (Step 603).

(4) The one-time password server 2 searches the database 6 for the online service user ID received, and if the online service user ID is stored in the database 6, it acquires the common key K and current value x of the strength of the one-time password for online service authentication stored in the database 6, generates an online service authentication preparation ID and a one-time password for online service authentication of strength x at random, sets x+1 as the current value of the strength of the one-time password for online service authentication stored in the database 6, and stores sets of online service authentication preparation IDs, service usage details and one-time passwords for online service authentication in the database 6. If the online service user ID received is not stored in the database 6, the one-time password server 2 generates the common key K, the online service authentication preparation ID and the one-time password for online service authentication at random. The one-time password server 2 then encrypts the connection bit string of the service usage details and the one-time password for online service authentication by the common key K and adds the MAC (Message Authentication Code) to the encrypted bit string, and transmits it as online service authentication preparation information with a corresponding online service authentication preparation ID to the online service server 1 (Step 604).

(5) The online service server 1 encodes the received online service authentication preparation information to a QR Code, and transmits the online service authentication preparation ID and QR Code to the online service client 7 of the information terminal device 3 (Step 605).

(6) The online service client 7 of the information terminal device 3 displays the received QR Code (Step 606).

(7) The one-time password client 9 decodes the online service authentication preparation information from the QR Code, and decodes the online service authentication preparation information with the common key K. If authentication by the MAC succeeds, the one-time password client 9 displays the service usage details and the one-time password for online service authentication (Step 607).

(8) The online service user checks that the service usage details currently displayed by the one-time password client 9 are the same as the service usage details inputted by the processing of the Step 601. If they are the same, the online service user inputs the one-time password for online service authentication currently displayed by the one-time password client 9 to the online service client 7 of the information terminal device 3 (Step 608).

(9) The online service client 7 of the information terminal device 3 transmits the online service authentication request containing the set of online service user ID, online service authentication preparation ID and one-time password for online service authentication to the online service server 1 (Step 609).

(10) The online service server 1 searches the database 6 by sets of online service user IDs, online service authentication preparation IDs and one-time passwords for online service authentication contained in the online service authentication request received. When there is a match with the sets of online service user IDs, online service authentication preparation IDs and one-time passwords for online service authentication stored in the database 6, the online service server 1 deems that authentication has succeeded, sets the initial value of the strength of the one-time password for online service authentication as the current value of the strength of the one-time password strength for online service authentication stored in the database 6, acquires the service usage details stored in the database 6 which are paired with the online service user IDs and online service authentication preparation IDs contained in the online service authentication request received, and provides an online service according to the service usage details. If authentication fails, the online service server 1 deletes sets of online service authentication preparation IDs and service usage details stored in the database 6, which are sets of online service user IDs and online service authentication preparation IDs contained in the online service authentication request received with the one-time password for online service authentication (Step 610).

The online service authenticating processing when the online service client of the information terminal device described above is used (when a one-time password is synchronized with the service usage details contained in an online service authentication request), can be implemented even if the shared secret information is changed to a fixed password for one-time password download and the steps 604-607 are changed to the following steps 611-615. The processing flow here is not shown.

(11) The one-time password server 2 searches the database 6 by the online service user ID received, and when the online service user ID is stored in the database 6, the one-time password server 2 acquires a current value x of the strength of the one-time password for online service authentication stored in the database 6 is acquired, generates at random an online service authentication preparation ID and one-time password for online service authentication having a strength x, sets x+1 as the current value of the strength of the one-time password for online service authentication stored in the database 6, and stores sets of online service authentication preparation IDs, service usage details and one-time passwords for online service authentication in the database 6. If the online service user ID received is not stored in the database 6, the one-time password server 2 generates an online service authentication preparation ID at random, and the one-time password server 2 transmits the online service authentication preparation ID to the online service server 1 (Step 611).

(12) The online service server 1 transmits the online service authentication preparation ID to the online service client 7 of the information terminal device 3 (Step 612).

(13) The one-time password client 9 of the portable terminal device 3 transmits the one-time password download request for online service authentication containing sets of online service user IDs and fixed passwords for one-time password download to the one-time password server 2 (Step 613).

(14) The one-time password server 2 searches the database 6 by sets of online service user IDs and fixed passwords for one-time password download contained in the received one-time password download request for online service authentication, and if there is a match with the sets of online service user IDs and fixed passwords for one-time password download stored in the database 6, it transmits a set of service usage details and a one-time password for online service authentication stored in the database 6 to the one-time password client 9 (Step 614).

(15) The one-time password client 9 displays the set of service usage details and the one-time password for online service authentication received (Step 615).

Next, the online service authenticating processing when an online service client of a portable terminal device is used in the authentication system of this invention will be described. It is assumed that the shared secret information used for processing here is a fixed password for one-time password download. The processing flow here is not shown.

(Process 701)
The one-time password client 9 of the portable terminal device 4 transmits a one-time password download request for online service login containing sets of online service user IDs and fixed passwords for one-time password download to the one-time password server 2.

(Process 702)
The one-time password server 2 searches the database 6 by sets of online service user IDs and fixed passwords for one-time password download contained in the received one-time password download request for online service login, and if there is a match with the sets of online service user IDs and fixed passwords for one-time password download stored in the database 6, it generates a one-time password for online service login at random, stores the one-time password for online service login in the database 6, and transmits the one-time password for online service login to the one-time password client 9.

(Process 703)
The one-time password client 9 starts the online service client 8 of the portable terminal device 4 with the online service user ID and the one-time password for online service login as arguments.

(Process 704)
The online service client 8 of the portable terminal device 4 transmits the online service login request containing the set of the online service user ID and the one-time password for online service login to the online service server 1.

(Process 705)
The online service server 1 searches the database 6 by sets of online service user IDs and one-time passwords for online service login contained in the online service login request received, and if there is a match with the sets of online service user IDs and one-time passwords for online service login stored in the database 6, it transmits an online service login success screen to the online service client 8 of the portable terminal device 4.

Next, the processing of e-mail authentication in the authentication system according to the present invention will be described. It is assumed that the shared secret information used for processing here is a fixed password for one-time password download. The processing flow here is not shown.

(Process 801)

When the one-time password server 2 receives an e-mail addressed to an online service user and the online service user ID of the online service user, it generates a one-time password for e-mail authentication at random, stores the one-time password for e-mail authentication in the database 6, records the one-time password for e-mail authentication and transmits it to the destination.

(Process 802)

The one-time password client 9 transmits the one-time password download request for e-mail authentication containing sets of online service user IDs and fixed passwords for one-time password download to the one-time password server 2.

(Process 803)

The one-time password server 2 searches the database 6 by sets of online service user IDs and fixed passwords for one-time password download contained in the received one-time password download request for e-mail authentication, and if there is a match with the sets of online service user IDs and fixed passwords for one-time password download stored in the database 6, it acquires the one-time password for e-mail authentication stored in the database 6, and transmits the one-time password for e-mail authentication to the one-time password client 9.

(Process 804)

The one-time password client 9 displays the one-time password for e-mail authentication received.

The online service user, after performing the processing 804, compares the one-time password for e-mail authentication recorded in the e-mail with the one-time password for e-mail authentication displayed by the one-time password client 9, and the online service user will learn that if they match, the e-mail sender is the online service provider, whereas if they do not match, the e-mail sender is not the online service provider.

Although the processing 801 described above assumes the case where the mail is an e-mail, even when sending another form of mail such as a postcard, the mail sender can still be authenticated by the one-time password for mail authentication.

Next, in the authentication system of the present invention, measures will be described to prevent an attacker from guessing a valid ID. This processing can be implemented by changing the process 203, process 204 and subsequent processes.

By the processing of the process 203 described above, the one-time password server 2 generates an online service user sub ID at random, stores the online service user sub ID in the database 6, and transmits the online service user sub ID to the one-time password client 9.

By the processing of the process 204 and subsequent processes, an online service user sub ID is used instead of an online service user ID. However, the sum value which an online service user sub ID can take needs to be far bigger than the total number of online service users, for example, about 10000.

Next, the strength of each password used with the embodiment of the above invention will be described. In general, the strength of a password is determined by the number of alphanumeric characters which constitute the password. Although it is determined considering the security of a system, and an online service user's convenience, in the embodiment of the present invention, an alphanumeric character string of about 32 characters is used as the dummy one-time password, the fixed password for one-time password download, and as a one-time password for online service login. An alphanumeric character string of about 8 characters is used as the fixed password for one-time password client initialization and fixed password for online service authentication, and further, an alphanumeric character string of about 8 characters is used as the fixed password for one-time password client startup, the one-time password for online service authentication and one-time password for e-mail authentication. The initial value of the one-time password strength for online service authentication is about eight.

The online service server 1, one-time password server 2 and information terminal device 3 which constitute the embodiment of this invention described above may be constituted by an information processor provided with a CPU, a memory, a hard disk drive, a display and an I/O device, etc. Although it has been described that the portable terminal device 4 is a cellular phone, the portable terminal device 4 may be a portable information processor constituted as described above.

The processing of each embodiment of the present invention described above is performed by programs executed by a CPU of a computer. The programs can be stored in recording media, such as FD, CDROM and DVD, or can be provided by digital information via a network.

According to the embodiment of the present invention, in authentication of a one-time password client initialization request, since the strength of the fixed password for one-time password client initialization according to the embodiment of this invention described above is as weak as about eight alphanumeric characters, the account lockout condition is included, but in authentication of the one-time password download request for online service authentication, since the strength of the fixed password for one-time password download is strengthened by about 32 alphanumeric characters, the account lockout condition is not included. Consequently, an attacker can be prevented from blocking an online service user's one-time password download request for online service authentication, so the first problem of the authentication system using a one-time password in the related art technique wherein the security of a one-time password always depends on the security of the fixed password inputted by the online service user, is resolved.

According to the embodiment of the present invention, depending on the presence or absence of one-time password client initialization and the presence or absence of a one-time password for online service authentication which is the authentication condition of an online service authentication request, a fixed password for online service authentication, a dummy one-time password or a one-time password for online service authentication is set as the password for online service authentication stored in the database, so the second problem of the authentication system using a one-time password of the related art technique wherein the processing of the Step 103 which performs authentication of an online service authentication request must be changed, is resolved.

According to the embodiment of the present invention, when sharing the one-time password for online service authentication, the current value of the present time information of the online service server and one-time password client and the number of online service authentication requests are made to coincide, and if the number of online service authentication requests after a fixed time has elapsed or after sharing exceeds a fixed number of times, the online service authentication request is deemed to be a failure, so the third problem of the authentication system using the one-time password of the related art technique wherein the one-time password for online service authentication calculated with an online service authentication request several minutes earlier or later or a number of times later as an argument, is authenticated, and the fourth problem wherein an attacker can attack without limit to time or number of times, are resolved.

According to the embodiment of the present invention, the online service authentication request which the online service server received from the online service client is authenticated by a one-time password for online service authentication for which the number of characters is the current value of the strength of the one-time password for online service authentication. If authentication fails, since the current value of the one-time password strength for online service authentication is increased, the fifth problem of the authentication system using the one-time password of the related art technique wherein the strength of the one-time password for online service authentication is not strong even if a specific online service user ID is attacked, is resolved.

According to the embodiment of the present invention, with respect to online service authentication preparation request including the service usage details which the one-time password server received from the online service client, the service usage details and the one-time password for online service authentication are synchronized, and after checking that the one-time password server for which the one-time password client is suitable, the service usage details and the one-time password for online service authentication have been shared, the service usage details and the one-time password for online service authentication are displayed, and since the online service user can check that the service usage details displayed on the one-time password client and the service usage details contained in an online service authentication preparation request are identical, the sixth problem of the authentication system using the one-time password of the related art technique wherein authentication is successful even if the service usage details contained in the online service authentication request are altered, is resolved.

According to the embodiment of the present invention, the one-time password client of a portable terminal device starts the online service client of the portable terminal device with the one-time password for online service login as an argument, and since the online service server authenticates an online service login request received from the online service client of the portable terminal device with the one-time password for online service login, the seventh problem of the authentication system using the one-time password of the related art technique wherein the one-time password cannot be used for the online service authentication process when the online service client uses a portable terminal device, is resolved.

According to the embodiment of the present invention, the one-time password server records the one-time password for e-mail authentication in an e-mail, and since the one-time password client displays the one-time password for e-mail authentication, the eighth problem of the authentication system using the one-time password of the related art technique wherein a one-time password cannot be used as a measure against phishing mail, is resolved.

According to the embodiment of the present invention, since an online service authentication request is authenticated by an online service user sub ID for which there are far more invalid IDs than valid IDs and which are assigned at random, the ninth problem of the authentication system using the one-time password of the related art technique wherein an attacker can guess an effective online service user ID and perform an account lockout, can be resolved.

BRIEF DESCRIPTION OF THE DRAWINGS

Hereinbelow, an embodiment of an authentication system and authentication method according to the present invention will be described with reference to the drawings.

EXPLANATION OF REFERENCE NUMERALS

Figure 1:
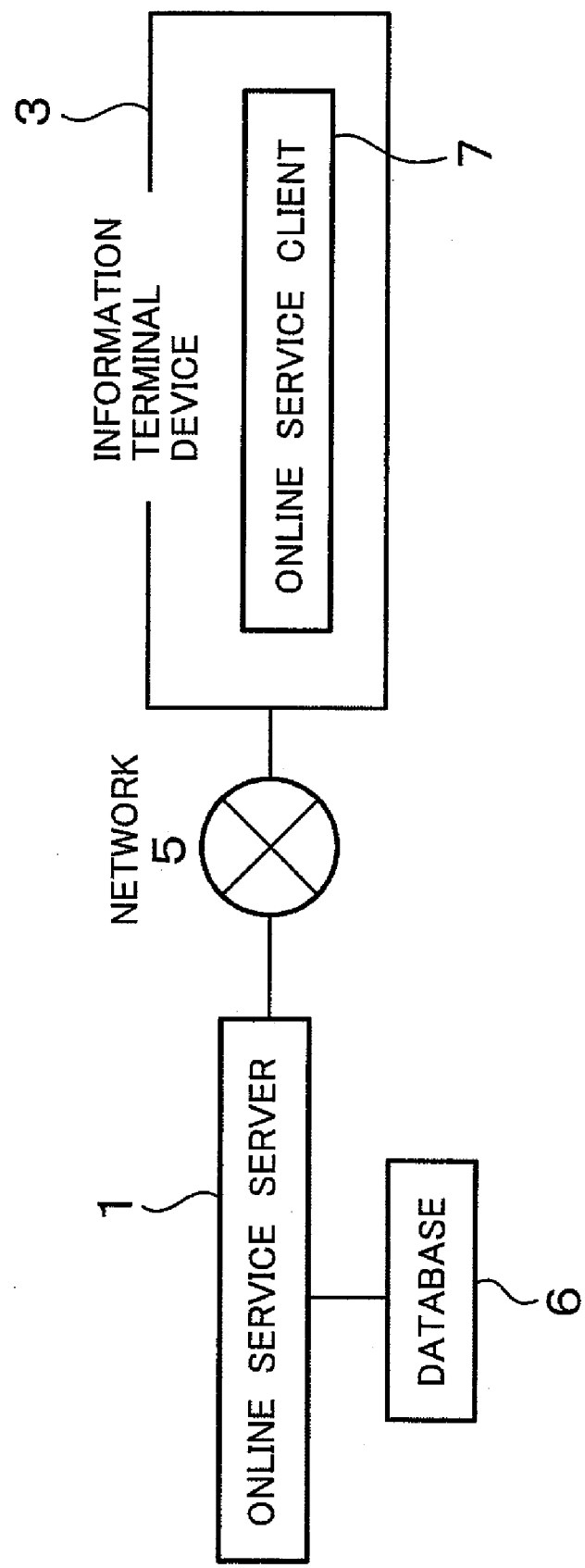
FIG. 1 is a block diagram showing an example of an authentication system according to a related art technique using a fixed password.
Figure 2:
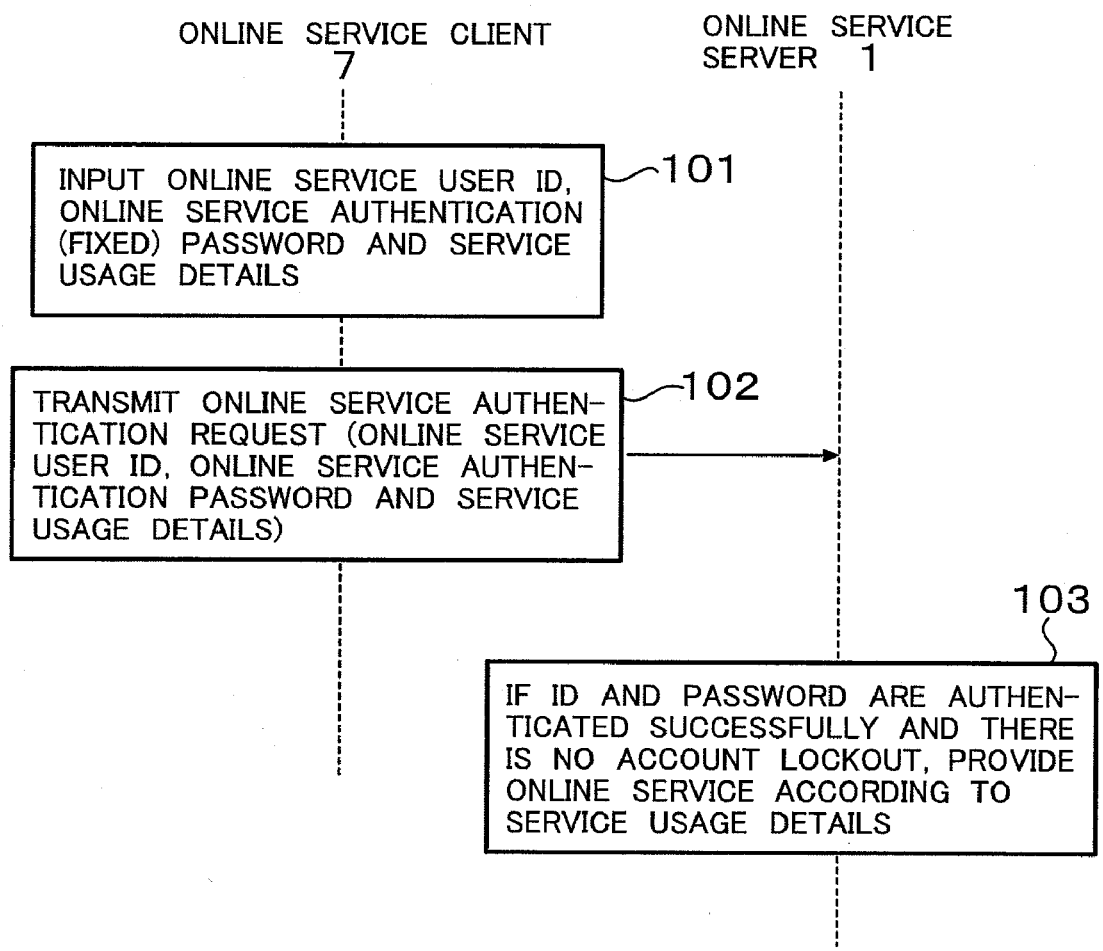
FIG. 2 is a flow chart describing the processing of online service authentication in an authentication system using a fixed password.
Figure 3:
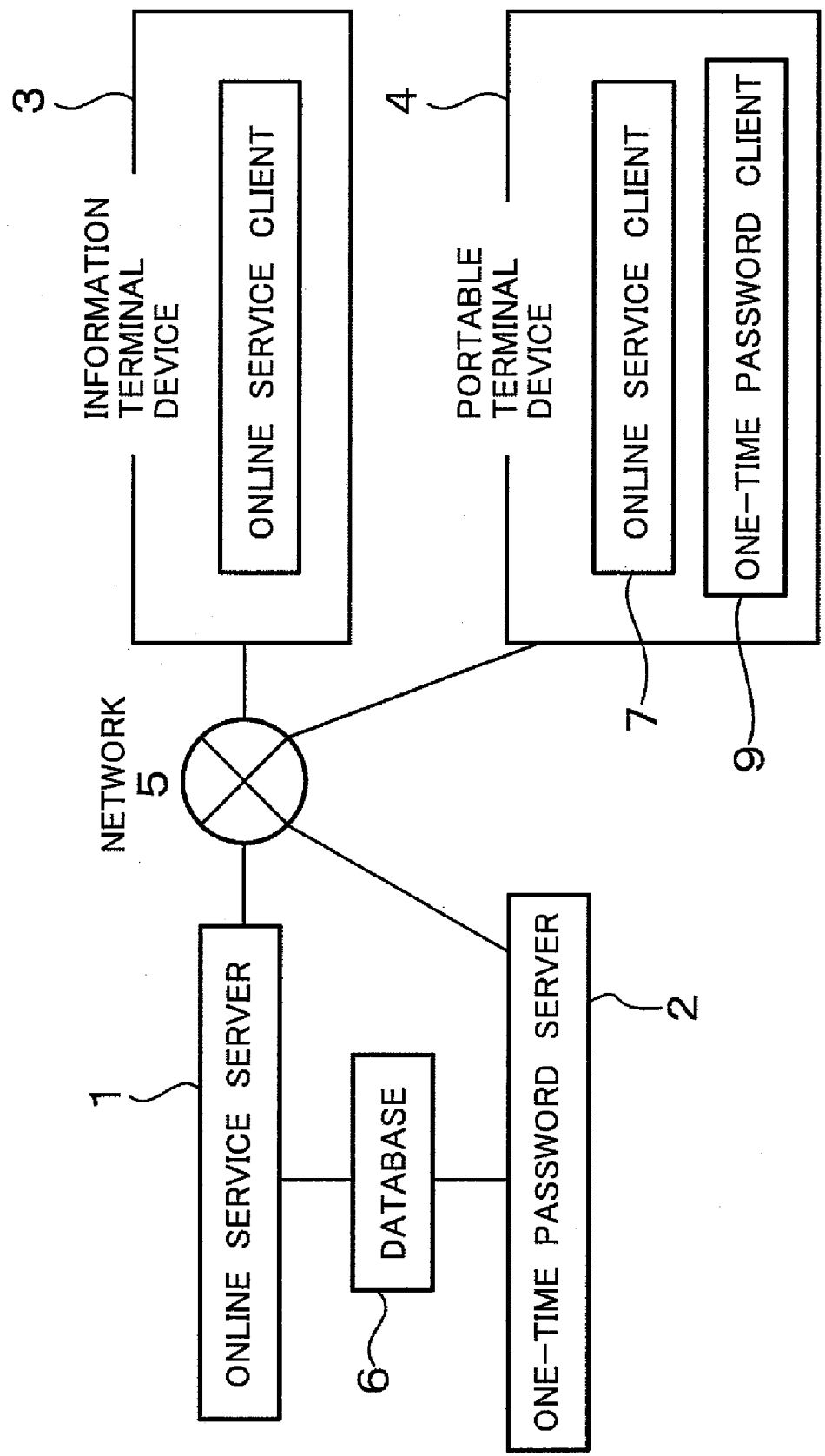
FIG. 3 is a block diagram showing the composition of an authentication system according to a first embodiment of the present invention.
Figure 4:
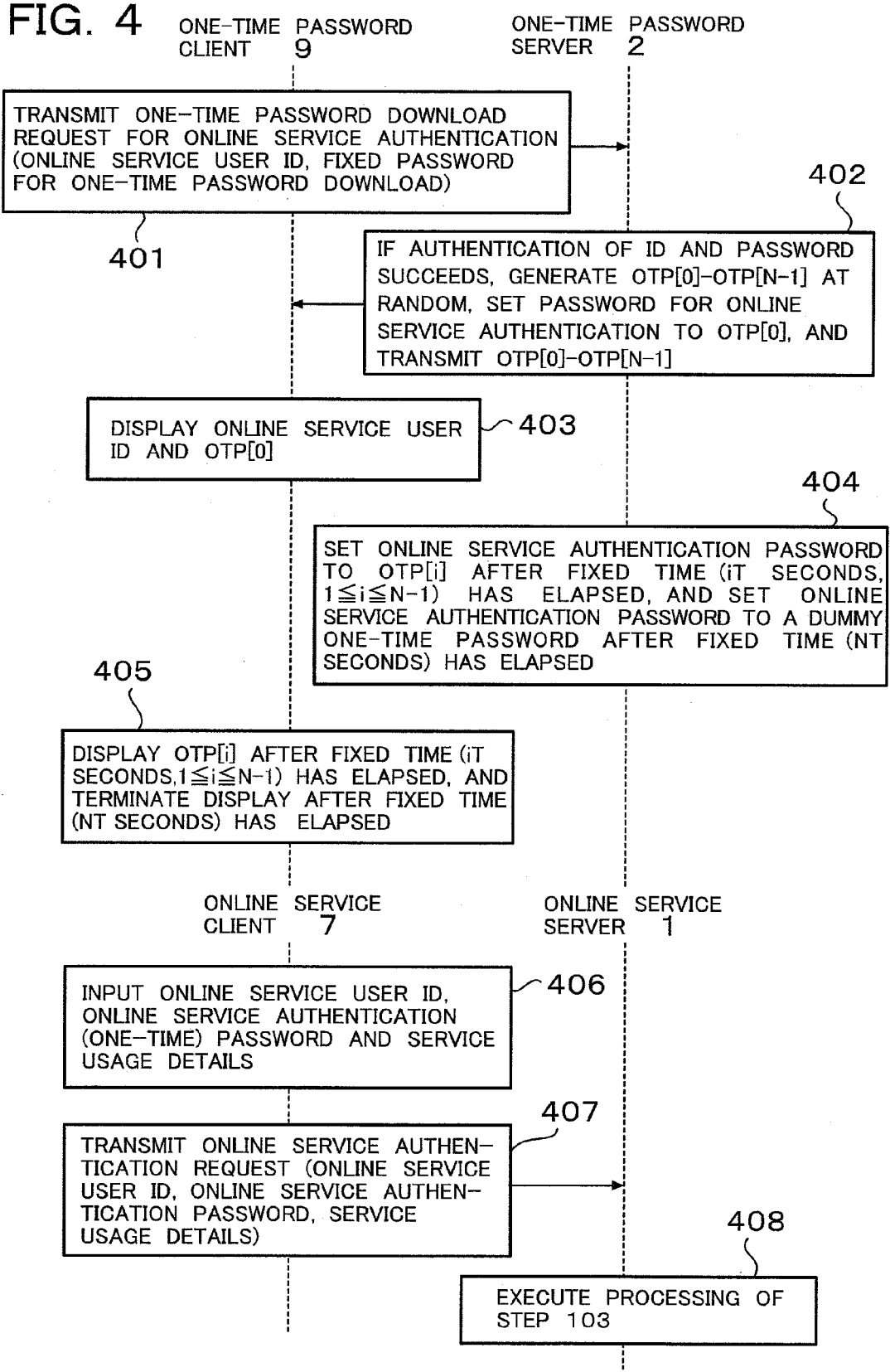
FIG. 4 is a flow chart describing the processing operation of online service authentication process when an online service client of an information terminal device is used (when a one-time password is synchronized with time).
Figure 5:
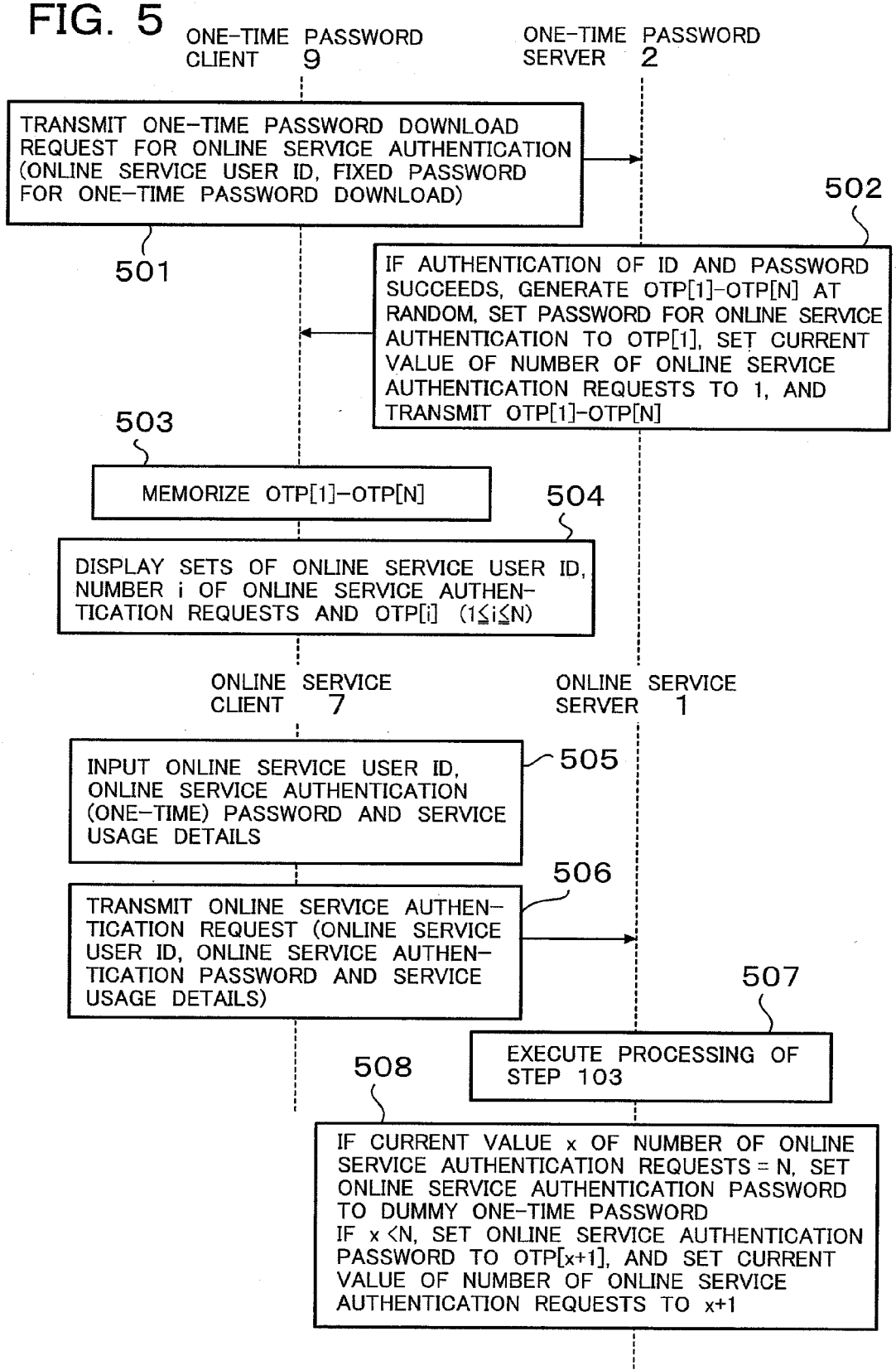
FIG. 5 is a flow chart describing the processing operation of online service authentication process when an online service client of an information terminal device is used (when a one-time password is synchronized with a number of online service authentication requests).
Figure 6:
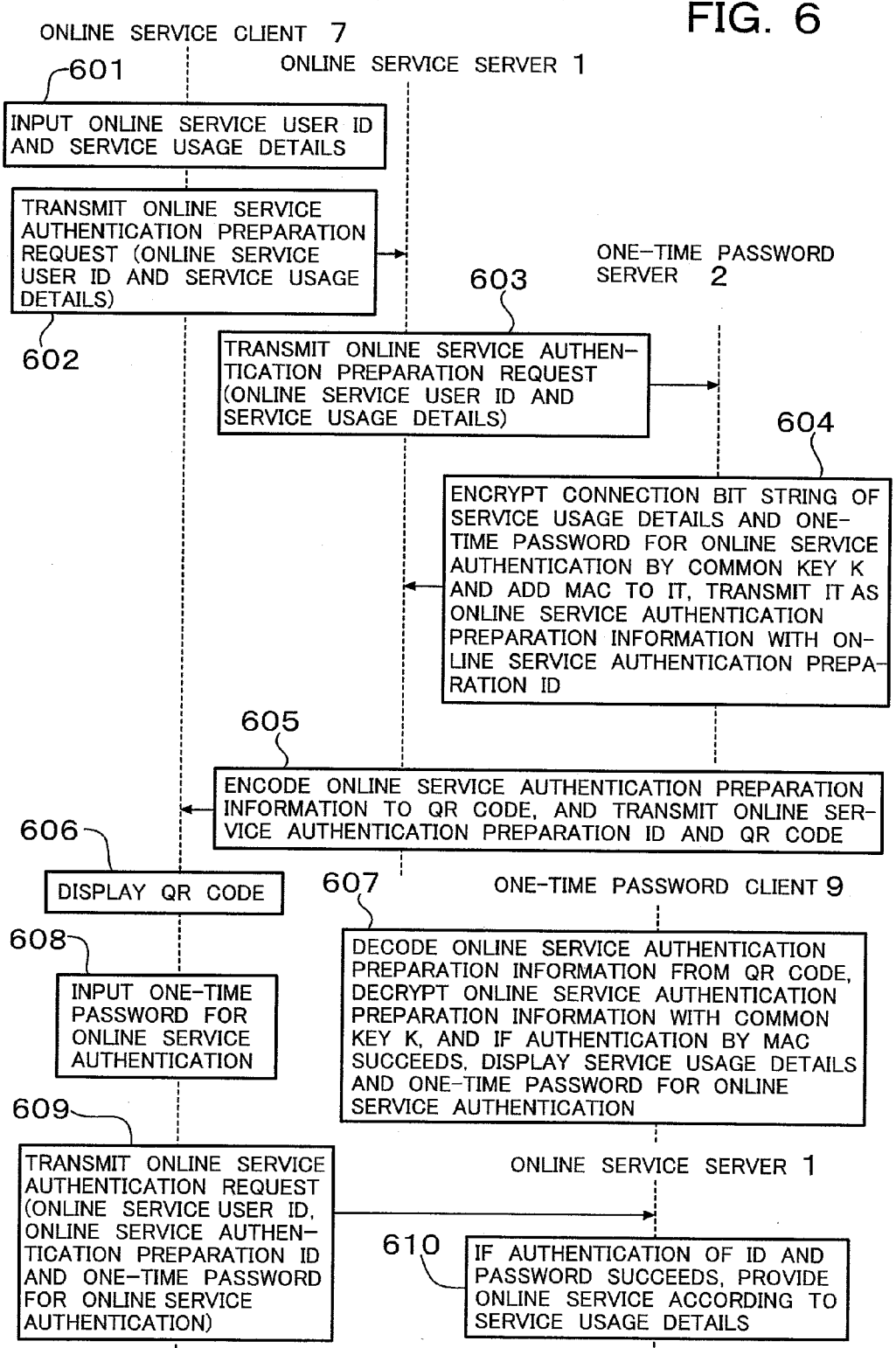
FIG. 6 is a flow chart describing the processing operation of online service authentication process when an online service client of an information terminal device is used (when a one-time password is synchronized with the service usage details contained in an online service authentication request).

1: Online service server
2: One-time password server
3: Information terminal device
4: Portable terminal device
5: Network
6: Database
7: Online service client
8: Online service client
9: One-time password client

The invention claimed is:
1. An authentication system in a client/server system wherein an online service server, a one-time password server, and an online service client are connected via a network, comprising:
the online service server; the one-time password server; the online service client; and a one-time password client, wherein
the one-time password server stores service usage details with respect to an online service authentication preparation request containing the service usage details received from the online service client;
the one-time password server, after authenticating a download request for a one-time password for online service authentication, shares common keys for encrypting sets of service usage details and a one-time password for online service authentication with the one-time password client;
the one-time password client decrypts, with the common key, and displays sets of the service usage details and one-time password for online service authentication; and
the online service server authenticates the online service authentication request received from the online service client by a one-time password for online service authentication,
the online service server, after receiving a set of the encrypted service usage details and the one-time password for online service authentication from the one-time password server, encodes it to a QR Code and transmits it to the online service client;

the online service client displays the QR Code; and the one-time password client inputs and decodes the QR Code, then decrypts the QR code with the common key.

2. An authentication method in a client/server system wherein an online service server, a one-time password server, and an online service client are connected via a network, comprising: the online service server; the one-time password server; the online service server; and a one-time password client, the method comprising the steps of:

storing, in the one-time password server, service usage details with respect to an online service authentication preparation request containing the service usage details received from the online service client;

sharing, in the one-time password server, a common key for encrypting sets of service usage details and one-time passwords for online service authentication, with the one-time password client, after authenticating a one-time password download request for online service authentication;

decoding, with the common key, and displaying the sets of service usage details and one-time password for online service authentication by the one-time password client; and authenticating, in the online service server, the online service authentication request received from the online service client by a one-time password for online service authentication, wherein after receiving a set of the encrypted service usage details and the one-time password for online service authentication from the one-time password server, encoding, in the online service server, the set to a QR Code and transmits the set to the online service client; and displaying the QR Code by the online service client; and inputting and decoding the QR Code by the one-time password client, then decrypting the QR code with the common key.

\* \* \* \* \*